United States Patent
Huang

(10) Patent No.: US 9,479,765 B2
(45) Date of Patent: Oct. 25, 2016

(54) AUTOSTEREOSCOPIC PROJECTION DEVICE

(71) Applicant: DELTA ELECTRONICS, INC., Taoyuan (TW)

(72) Inventor: June-Jei Huang, Taoyuan (TW)

(73) Assignee: DELTA ELECTRONICS, INC. (TW)

( * ) Notice: Subject to any disclaimer, the term of this patent is extended or adjusted under 35 U.S.C. 154(b) by 105 days.

(21) Appl. No.: 14/675,930

(22) Filed: Apr. 1, 2015

(65) Prior Publication Data

US 2016/0134861 A1    May 12, 2016

(30) Foreign Application Priority Data

Nov. 10, 2014   (TW) .............................. 103138847 A

(51) Int. Cl.

| G02B 27/22 | (2006.01) |
|---|---|
| H04N 13/04 | (2006.01) |
| G03B 35/16 | (2006.01) |
| G03B 21/00 | (2006.01) |
| G03B 21/28 | (2006.01) |

(52) U.S. Cl.
CPC .......... *H04N 13/0447* (2013.01); *G02B 27/22* (2013.01); *G02B 27/2221* (2013.01); *G03B 35/16* (2013.01); *H04N 13/04* (2013.01); *H04N 13/0418* (2013.01); *G03B 21/008* (2013.01); *G03B 21/28* (2013.01)

(58) Field of Classification Search
CPC ...... G02B 27/22; G02B 21/20; G03B 35/16; G03B 21/20; G03B 21/28; G03B 35/22; H04N 13/04
See application file for complete search history.

(56) References Cited

U.S. PATENT DOCUMENTS 7,894,419 B2   2/2011  Turpin et al.
7,944,465 B2   5/2011  Goulanian et al.
(Continued)

FOREIGN PATENT DOCUMENTS

| CN | 102566250 | 7/2012 |
|---|---|---|
| CN | 103513438 | 1/2014 |
| TW | 201346336 | 11/2013 |
| TW | 201348747 | 12/2013 |

OTHER PUBLICATIONS

Kanebako, Tsubasa et al., "Time-multiplexing display module for high-density directional display", SPIE Proceedings vol. 6803, 2008.
(Continued)

*Primary Examiner* — Sultan Chowdhury
*Assistant Examiner* — Danell L Owens
(74) *Attorney, Agent, or Firm* — Hauptman Ham, LLP

(57) ABSTRACT

An autostereoscopic projection device includes an illuminating module, a light modulator, an optical module, and a lens module. The illuminating module is for providing light beams having different deflection angles in sequence. The light modulator is for modulating the light beams into compound images in sequence. The optical module is for guiding the light beams provided by the illuminating module to the light modulator, and guiding the compound images to the lens module. The lens module includes a beam splitting prism group, a first spatial filter, a second spatial filter, and a lens. The optical module is disposed at the incident surface of the beam splitting prism group. The first and second spatial filters are disposed at the first and second relay surfaces of beam splitting prism group for filtering the compound images to first and second images in sequence. The second images are different from the first images.

10 Claims, 7 Drawing Sheets

(56) References Cited

U.S. PATENT DOCUMENTS

2011/0063575 A1  3/2011  Nelson et al.
2013/0301010 A1* 11/2013 Huang ............... G02B 27/1046
                                                             353/8

OTHER PUBLICATIONS

Ishinabe, Takahiro et al., "High-Resolution Floating Autostereoscopic 3D Display Based on Iris-Plane-Dividing Technology", SID Symposium Digest of Technical Papers, pp. 225-228, 2012.

* cited by examiner

AUTOSTEREOSCOPIC PROJECTION DEVICE

RELATED APPLICATIONS

This application claims priority to Taiwan Application Serial Number 103138847, filed Nov. 10, 2014, which is herein incorporated by reference.

BACKGROUND

1. Field of Invention

The present invention relates to an autostereoscopic projection device.

2. Description of Related Art

Exploiting the binocular parallax of humans, a stereoscopic display enables an observer to experience a stereoscopic image by providing two different images respectively to two eyes of the observer. An autostereoscopic display, unlike other kinds of stereoscopic displays which require special glasses to distinguish left-eye and right-eye images, provides a plurality of images from a plurality of light sources, in which the respective images are projected to different spatial positions. The two eyes of an observer can receive different images corresponding to any two of the spatial positions respectively so that the observer perceives a stereoscopic image. Autostereoscopic display technology avoids the inconvenience of wearing glasses necessary in stereoscopic display technology, and has become an area of the most interested developments in recent times.

SUMMARY

An aspect of the present invention is to provide an autostereoscopic projection device including an illuminating module, a light modulator, an optical module, and a lens module. The illuminating module is configured for providing a plurality of light beams in sequence. The light beams have different deflection angles. The light modulator is configured for modulating the light beams into a plurality of compound images in sequence. The optical module is configured for guiding the light beams provided by the illuminating module to the light modulator, and guiding the compound images to the lens module. The lens module includes a beam splitting prism group, a first spatial filter, a second spatial filter, and a lens. The beam splitting prism group has an incident surface, a light-emitting surface, a first relay surface, and a second relay surface, and includes a double-sided reflector disposed between the first relay surface and the second relay surface. The optical module is disposed at the incident surface. The first spatial filter is disposed at the first relay surface for filtering the compound images to a plurality of first images in sequence. The second spatial filter is disposed at the second relay surface for filtering the compound images to a plurality of second images in sequence. The second images are different from the first images. The lens is disposed at the light-emitting surface.

In one or more embodiments, the beam splitting prism group further includes a first right angle prism, a second right angle prism, and a third right angle prism. The first right angle prism has the incident surface and the light-emitting surface. The second right angle prism has the first relay surface. The third right angle prism has the second relay surface. The double-sided reflector is disposed between the second right angle prism and the third right angle prism.

In one or more embodiments, the compound image includes a plurality of pixel images arranged in an array manner. The first spatial filter only reflects odd columns of the pixel images, and the second spatial filter only reflects even columns of the pixel images.

In one or more embodiments, the first spatial filter includes a transparent plate and a reflective layer disposed on the transparent plate. The reflective layer corresponds to the odd columns of the pixel images.

In one or more embodiments, the first spatial filter includes a reflective plate and a light-absorbing layer disposed on the reflective plate. The light-absorbing layer corresponds to the even columns of the pixel images.

In one or more embodiments, the lens module further includes a first relay lens group and a second relay lens group. The first relay lens group is disposed between the beam splitting prism group and the first spatial filter. The second relay lens group is disposed between the beam splitting prism group and the second spatial filter.

In one or more embodiments, both of the first relay lens group and the second relay lens group are off-axially disposed from an optical axis of the compound images.

In one or more embodiments, the lens module further includes an entrance lens group disposed between the beam splitting lens group and the optical module.

In one or more embodiments, the optical module includes a total internal reflection prism group.

In one or more embodiments, the optical module includes a light source and a light-deflecting device. The light source is configured for providing the light beams. The light-deflecting device is configured for deflecting the light beams to different angles in sequence.

DETAILED DESCRIPTION

Figure 1:
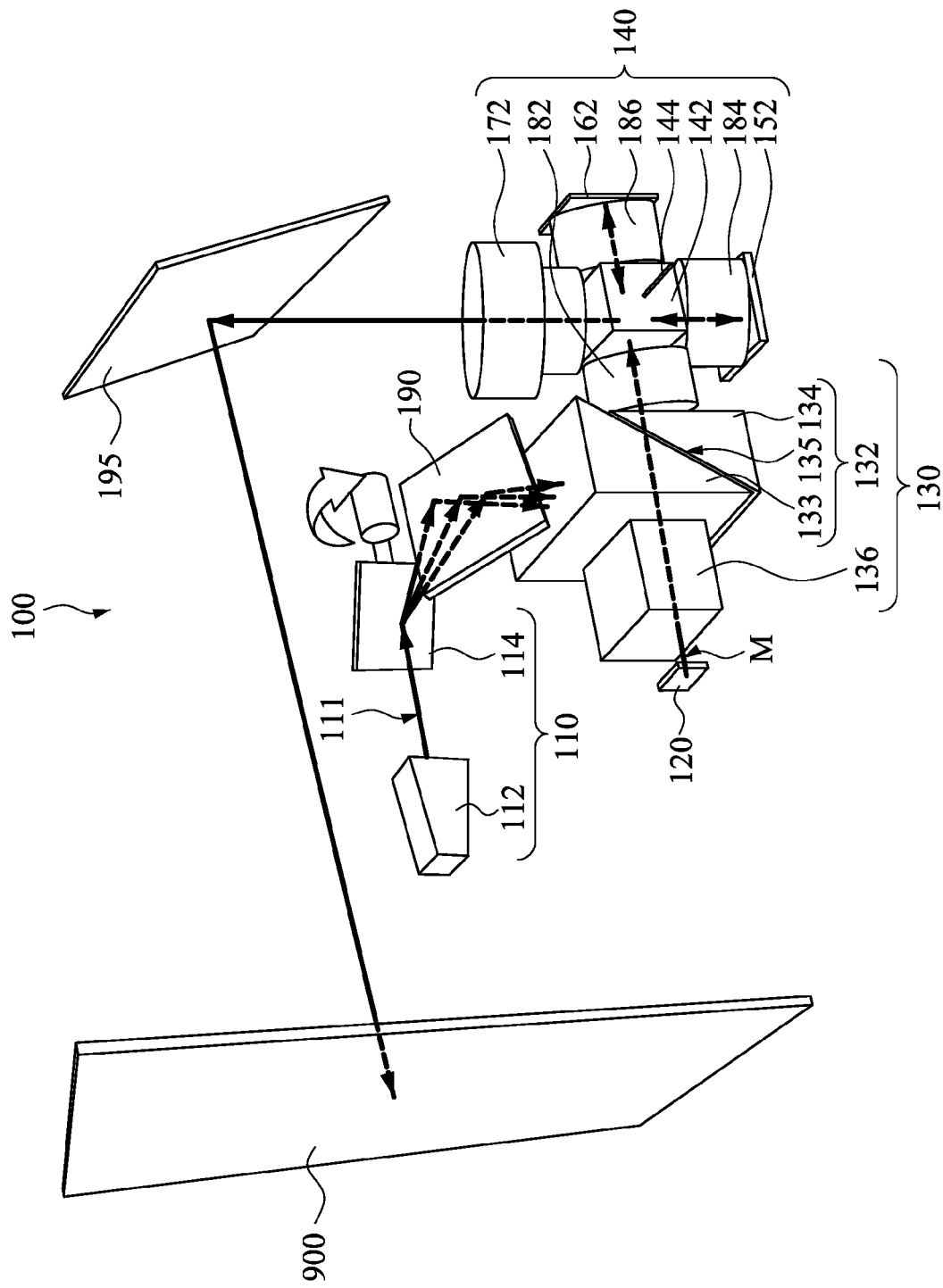
FIG. 1 is a three-dimensional schematic diagram of an autostereoscopic projection display and a screen according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
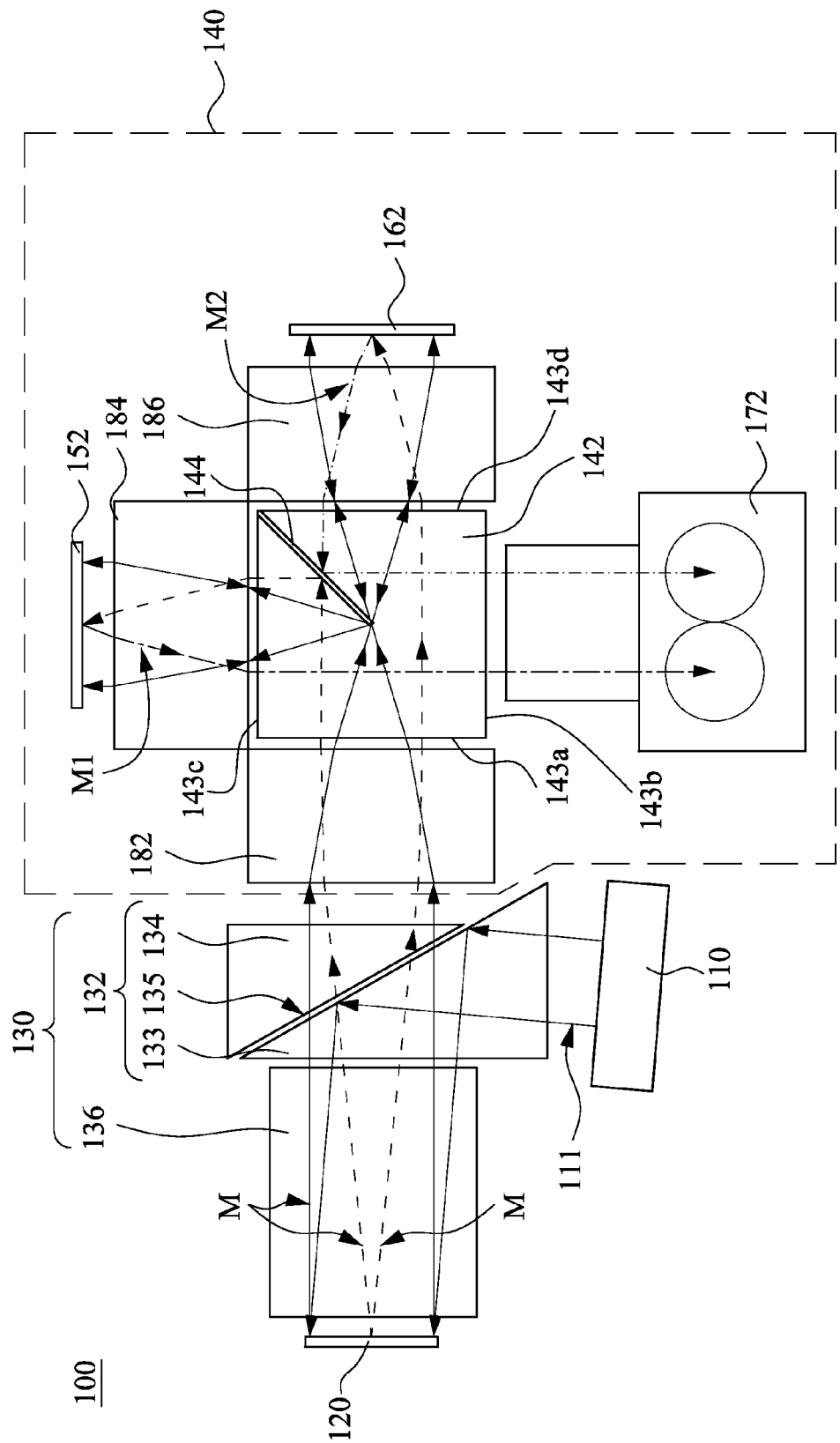
FIG. 2 is a plane view of the autostereoscopic display of FIG. 1.

FIG. 1 is a three-dimensional schematic diagram of an autostereoscopic projection display 100 and a screen 900 according to one embodiment of the present invention, and FIG. 2 is a plane view of the autostereoscopic display 100 of FIG. 1. The solid arrows in FIG. 2 indicate the traveling paths of edges of the whole light beams 111 (or compound images M, first images M1, second images M2), and the dashed lines in FIG. 2 indicate the traveling paths of single pixel of the compound images M (or the first images M1, the second images M2). The autostereoscopic projection device 100 includes an illuminating module 110, a light modulator 120, an optical module 130, and a lens module 140. The illuminating module 110 is configured for providing a plurality of light beams 111 in sequence. The light beams 111 have different deflection angles. For clarity, in FIG. 1, the light beams 111 with different deflection angles are depicted on the path between the illuminating module 110 and the optical module 130 while the optical axes of the light beams 111 (or the compound images M, the first images M1, the second images M2) are depicted at other places to represent their traveling path; in FIG. 2, a single traveling path of the light beam 111 (or the compound image M, the first image M1, the second image M2) having a deflection angle is depicted. The light modulator 120 is configured for modulating the light beams 111 into a plurality of the compound images M in sequence. The optical module 130 is configured for guiding the light beams 111 provided by the illuminating module 110 to the light modulator 120, and guiding the compound images M to the lens module 140. The lens module 140 includes a beam splitting prism group 142, a first spatial filter 152, a second spatial filter 162, and a lens 172. The beam splitting prism group 142 has an incident surface 143a, a light-emitting surface 143b, a first relay surface 143c, and a second relay surface 143d, and includes a double-sided reflector 144 disposed between the first relay surface 143c and the second relay surface 143d. The optical module 130 is disposed at the incident surface 143a. The first spatial filter 152 is disposed at the first relay surface 143c for filtering the compound images M to a plurality of the first images M1 in sequence. The second spatial filter 162 is disposed at the second relay surface 143d for filtering the compound images M to a plurality of the second images M2 in sequence. The second images M2 are different from the first images M1. The lens 172 is disposed at the light-emitting surface 143b.

In greater detail, in one time period, the illuminating module 110 provides the light beam 111 with a specific deflection angle. The light beam 111 is guided to the light modulator 120 by the optical module 130. After the optical module 120 modulates the light beam 111 into the compound image M, the optical module 130 guides the compound image M to the lens module 140. The compound image M is incident the beam splitting prism group 142 of the lens module 140 from the incident surface 143a. A portion of the compound image M is reflected to the first relay surface 143c by the double-sided reflector 144. The lens module 140 deflects this portion of the compound image M when the compound image M is off-axially incident the first spatial filter 152 (the detail will be described in the following paragraphs). Another portion of the compound image M passes through the second relay surface 143d. The lens module 140 deflects this portion of the compound image M when the compound image M is off-axially incident the second spatial filter 162 (the detail will be described in the following paragraphs). The first spatial filter 152 filters the compound image M to the first image M1, and the second spatial filter 162 filters the compound image M to the second image M2. The first image M1 and the second image M2 propagate back to the beam splitting prism group 142 respectively from the first relay surface 143c and the second relay surface 143d. Since the compound image M is respectively off-axially incident the first spatial filter 152 and the second spatial filter 162, the first image M1 and the second image M2 propagating back to the beam splitting prism group 142 relatively shift from the compound image M with specific distances. For example, the first image M1 shifts toward the out-of-plane direction of FIG. 2, and the second image M2 shifts toward the in-plane direction of FIG. 2. Subsequently, the first image M1 and the second image M2 respectively pass through the beam splitting prism group 142 and reach the lens 172, and then are projected to the screen 900. Therefore, if the illuminating module 110 of the present invention provides the light beams 111 corresponding to N-views, in this time period, the lens 172 of the autostereoscopic projection device 110 simultaneously generates an image corresponding to 1st-view, i.e., the first image M1, and an image corresponding to (N+1)th-view, i.e., the second image M2. In the next time period, the lens 172 simultaneously generates an image corresponding to 2nd-view, i.e., the first image M1, and an image corresponding to (N+2)th-view, i.e., the second image M2, and so on. Therefore, after N time periods, the autostereoscopic projection device 100 can generate 2N-view images. Since all of the first images M1 and the second images M2 of each time period have displacements, the aperture of the lens 172 is enlarged, and the projection angle of the lens 172 is wider than the projection angle of the illuminating module 110. The wide projection angle of the lens 172 prevents the first images M1 and the second images M2 from generating Airy disk on the screen 900, which affects image resolution on the view surface.

In this embodiment, the lens module 140 further includes an entrance lens group 182, a first relay lens group 184, and a second relay lens group 186. The entrance lens group 182 is disposed between the beam splitting lens group 142 and the optical module 130. The first relay lens group 184 is disposed between the beam splitting prism group 142 and the first spatial filter 152. The second relay lens group 186 is disposed between the beam splitting prism group 142 and the second spatial filter 162. Each of the entrance lens group 182, the first relay lens group 184, and the second relay lens group 186 can include a plurality of lenses (not shown). The entrance lens group 182 is configured for imaging lights of a point source at infinity, i.e., the lights become parallel lights. That is, the compound image M incident the entrance lens group 182 becomes plane source. The first relay lens group 184 is configured for imaging infinite lights (the compound image M herein) at the first spatial filter 152, and imaging the first images M1 generated by the first spatial filter 152 at infinity. Similarly, the second relay lens group 186 is configured for imaging infinite lights (the compound image M herein) at the second spatial filter 162, and imaging the second images M2 generated by the second spatial filter 162 at infinity. Subsequently, the lens 172 images infinite lights, i.e., the first images M1 and the second images M2 at the lens 172, to the screen 900.

Figure 3B:
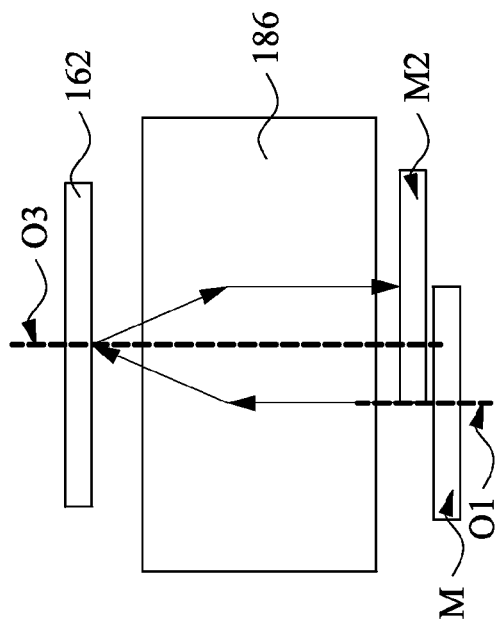
FIG. 3B is an optical schematic diagram of the compound image of FIG. 2 passing through the second relay lens group and the second spatial filter.
Figure 3A:
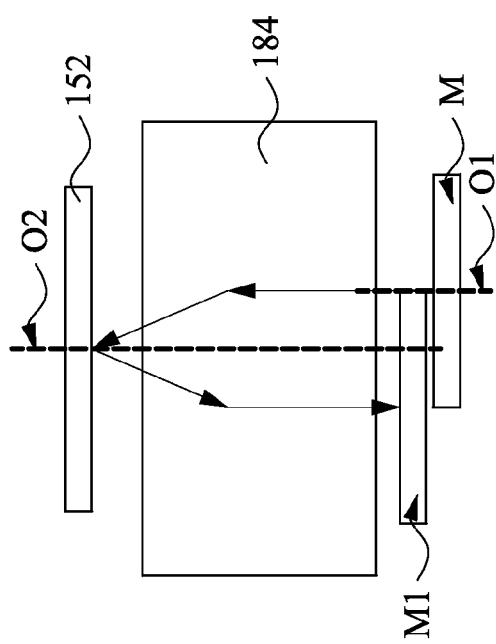
FIG. 3A is an optical schematic diagram of the compound image of FIG. 2 passing through the first relay lens group and the first spatial filter.

FIG. 3A is an optical schematic diagram of the compound image M of FIG. 2 passing through the first relay lens group 184 and the first spatial filter 152, and FIG. 3B is an optical schematic diagram of the compound image M of FIG. 2 passing through the second relay lens group 186 and the second spatial filter 162. For achieving the displacements of the first images M1 and the second images M2 mentioned above, both of the first relay lens group 184 and the second relay lens group 186 are off-axially disposed from the optical axis O1 of the compound image M. That is, both of optical axes O2 and O3 of the first relay lens group 184 and the second relay lens group 186 do not overlap the optical axis O1. Therefore, the position of the first image M1 is shifted relative to the compound image M when it leaves the first relay lens group 184, and the position of the second image M2 is shifted relative to the compound image M when it leaves the second relay lens group 186, wherein the optical axes O2 and O3 are relatively shifted toward opposite sides of the optical axis O1.

Figure 4A:
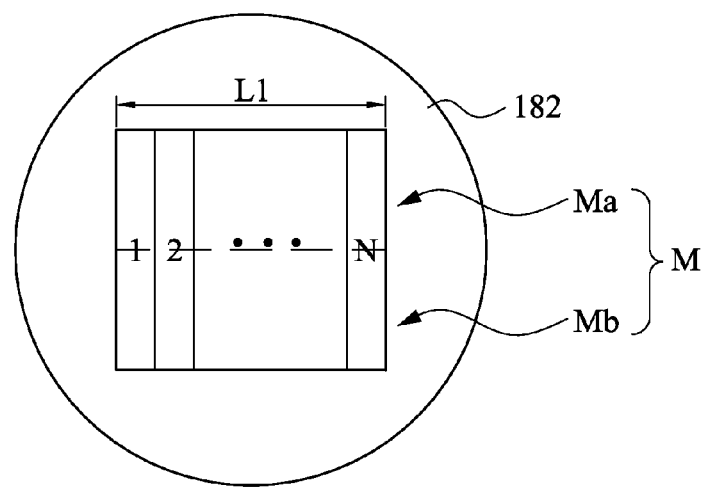
FIG. 4A is a front view of the entrance lens group of FIG. 2.
Figure 4B:
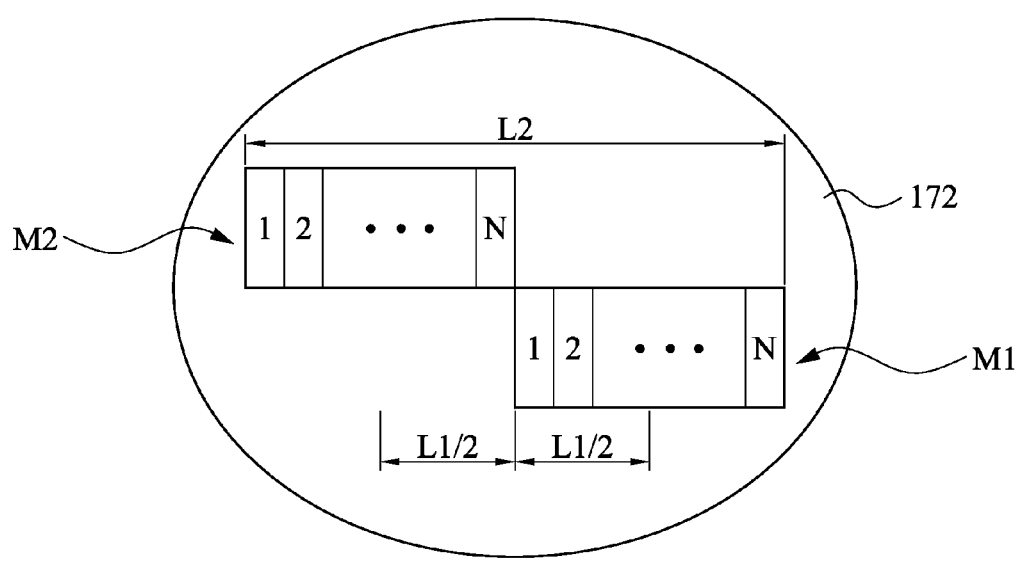
FIG. 4B is a front view of the lens of FIG. 2B.

FIG. 4A is a front view of the entrance lens group 182 of FIG. 2, and FIG. 4B is a front view of the lens 172 of FIG. 2B. Reference is made to FIGS. 2, 4A, and 4B. Taking N views as an example, the marks 1, 2, . . . , N of FIG. 4A represent the positions of the compound images M of N-views passing through the entrance lens group 182, and the marks 1, 2, . . . , N of FIG. 4B represent the positions of the first images M1 and the second images M2 of N-views passing through the lens 172. In FIG. 4A, the compound images M of N-views pass through the entrance lens group 182 in sequence. The N-view compound images M have an aperture length L1, wherein each view of the compound images M corresponds to a length L1/N. The upper portions of the compound images Ma propagate to the first spatial filter 152 (see FIG. 2) and are filtered to be the first images M1. Subsequently, the first images M1 pass through the bottom portion of the beam splitting prism group 142 and reach the bottom portion of the lens 172 (see FIG. 4B). At the mean time, the first images M1 shift a distance of L1/2 towards right-hand side of FIG. 4B (i.e., the out-of-plane direction of FIG. 2) since the shift of the first relay lens group 184 (for example, shifting a distance of L1/2. On the other hand, the bottom portions of the compound images Mb propagate to the second spatial filter 162 and are filtered to be the second images M2. Subsequently, the second images M2 pass through the top portion of the beam splitting prism group 142 and reach the top portion of the lens 172 (see FIG. 4B). At the mean time, the second images M2 shift a distance of L1/2 towards left-hand side of FIG. 4B (i.e., the in-plane direction of FIG. 2) since the shift of the second relay lens group 184 (for example, shifting a distance of L1/2). Hence, the first images M1 and the second images M2 passing through the lens 172 have an aperture length L2=2 L1, and the view number of the lens 172 is twice the illuminating module 110.

Figure 5:
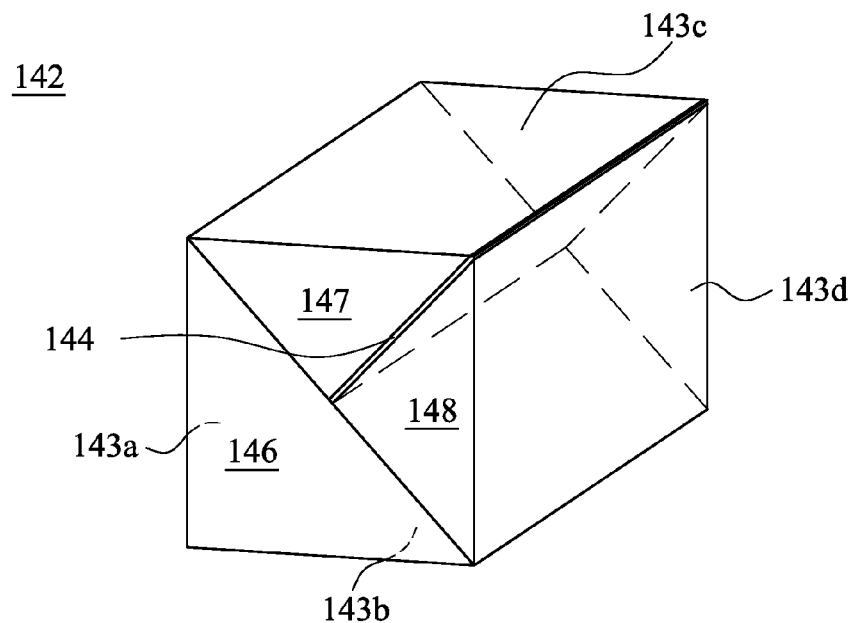
FIG. 5 is a three dimensional schematic diagram of the beam splitting prism group of FIG. 2.

FIG. 5 is a three dimensional schematic diagram of the beam splitting prism group 142 of FIG. 2. In this embodiment, the beam splitting prism group 142 further includes a first right angle prism 146, a second right angle prism 147, and a third right angle prism 148. The first right angle prism 146 has the incident surface 143a and the light-emitting surface 143b. The second right angle prism 148 has the first relay surface 143c. The third right angle prism 148 has the second relay surface 143d. The double-sided reflector 144 is disposed between the second right angle prism 147 and the third right angle prism 148. The size of the first right angle prism 146 is substantially twice the second right angle prism 147 (or the third right angle prism 148). The first right angle prism 146, the second right angle prism 147, and the third right angle prism 148 can be laminated together, and the double-sided reflector 144 can be coated on the second right angle prism 147 or the third right angle prism 148, i.e., the double-sided reflector 144 is a coating layer. Hence, the double-sided reflector 144 is disposed between the second right angle prism 147 and the third right angle prism 148 after they are laminated. However, the aforementioned embodiment is illustrative only. An embodiment falls within the claimed scope of the invention if the beam splitting prism group 142 can respectively guide the compound images M (see FIG. 2) to the first relay surface 143c and the second relay surface 143d.

Figure 6:
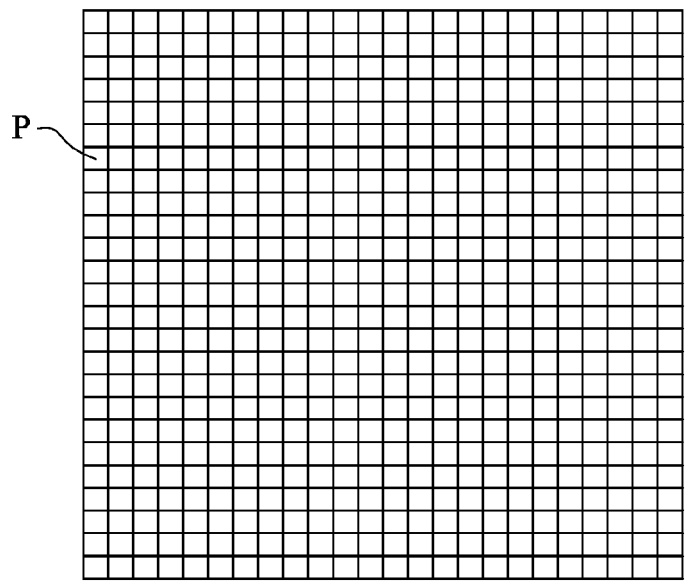
FIG. 6 is a front view of the compound image of FIG. 2.
Figure 7A:
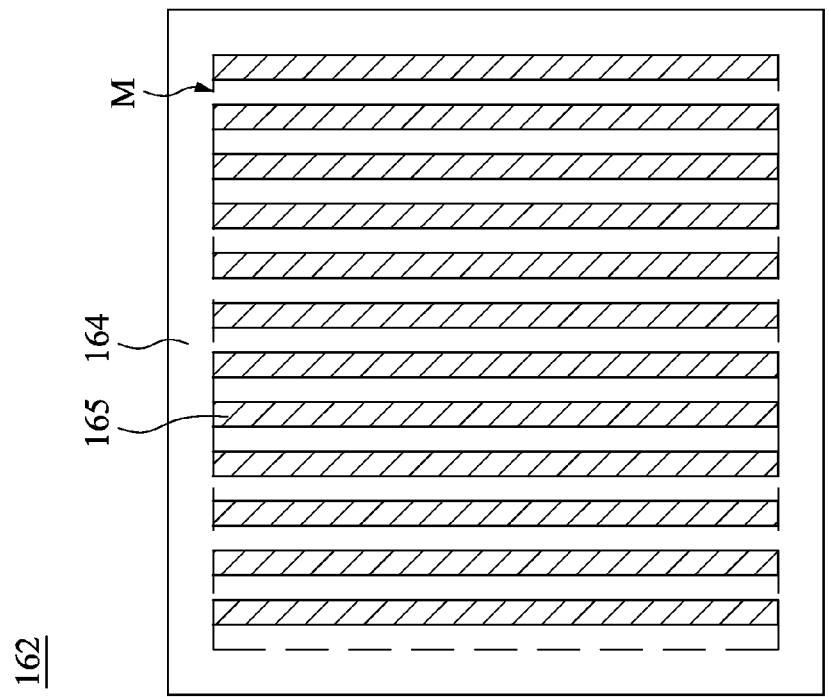
FIG. 7A is a front view of the first spatial filter of FIG. 2 according to one embodiment.
Figure 7B:
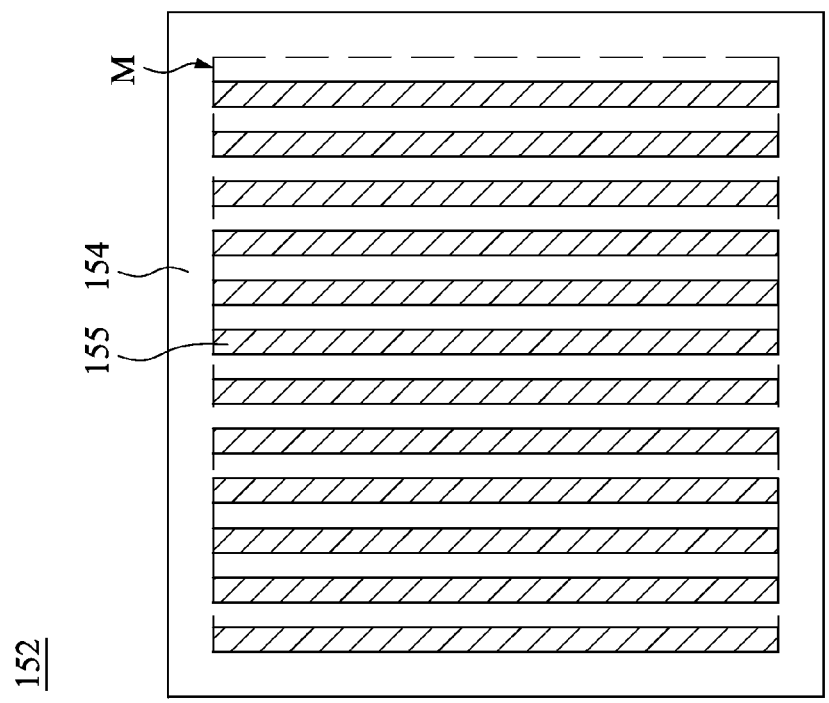
FIG. 7B is a front view of the second spatial filter of FIG. 2 according to one embodiment.

The following paragraphs provide detailed explanations with respect to how to filter the compound images M to the first images M1 and the second images M2. FIG. 6 is a front view of the compound image M of FIG. 2, FIG. 7A is a front view of the first spatial filter 152 of FIG. 2 according to one embodiment, and FIG. 7B is a front view of the second spatial filter 162 of FIG. 2 according to one embodiment. In this embodiment, the compound image M includes a plurality of pixel images P arranged in an array manner. The first spatial filter 152 only reflects the pixel images P at odd columns, and the second spatial filter 162 only reflects the pixel images P at even columns. More specifically, the light modulator 120 (see FIG. 2) can be a digital micro mirror device (DMD), which includes a plurality of micro mirrors arranged in an array manner. The micro mirrors at odd columns can modulate the light beam 111 (see FIG. 2) into the first image M1 while the micro mirrors at even columns can modulate the light beam 111 into the second image M2. Hence, the odd-column pixel images P of the compound image M form the first image M1, and the even-column pixel images P form the second image M2. When the compound image M reaches the first spatial filter 152, the first spatial filter 152 reflects the odd-column pixel images P to form the first image M1. On the other hand, when the compound image M reaches the second spatial filter 162, the second spatial filter 162 reflects the even-column pixel images P to form the second image M2. Therefore, the first image M1 and the second image M2 can be respectively filtered out.

In this embodiment, the first spatial filter 152 and the second spatial filter 162 can respectively include transparent plates 154, 164, and reflective layers 155, 165. The reflective layers 155, 165 are respectively disposed on the transparent plates 154, 164 by coating for example. The reflective layers 155, 165 respectively correspond to the odd- and the even-column pixel images P. In greater detail, the odd-column pixel images P are reflected by the reflective layer 155 while the even-column pixel images P pass through the transparent plate 154 when the compound image M is incident the first spatial filter 152. Hence, only the first image M1 (see FIG. 2) can propagate back to the beam splitting prism group 142 (see FIG. 2). On the other hand, the even-column pixel images P are reflected by the reflective layer 165 while the odd-column pixel images P pass through the transparent plate 164 when the compound image M is incident the second spatial filter 162. Hence, only the second image M2 (see FIG. 2) can propagate back to the beam splitting prism group 142.

Figure 8B:
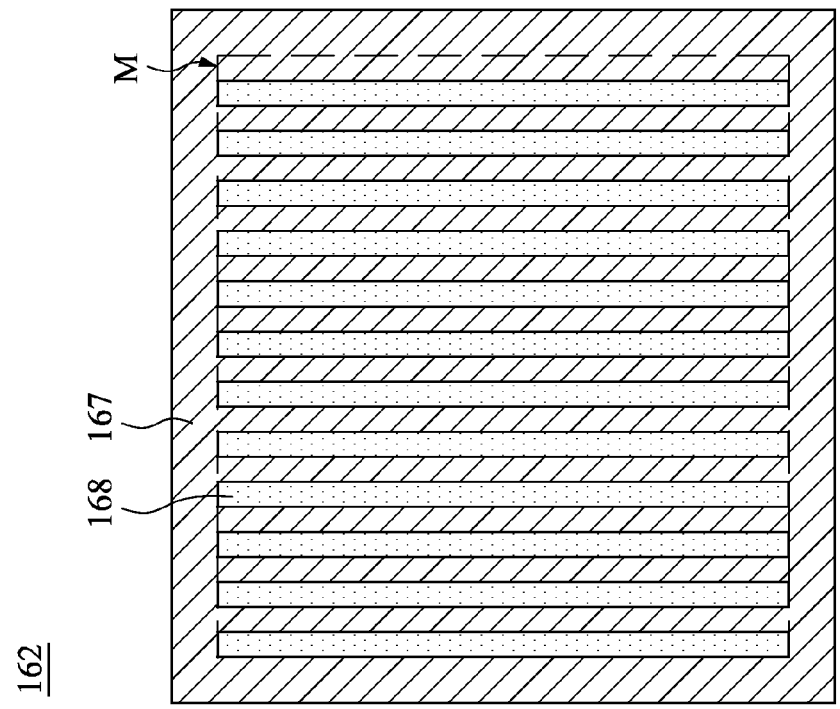
FIG. 8B is a front view of the second spatial filter of FIG. 2 according to another embodiment.
Figure 8A:
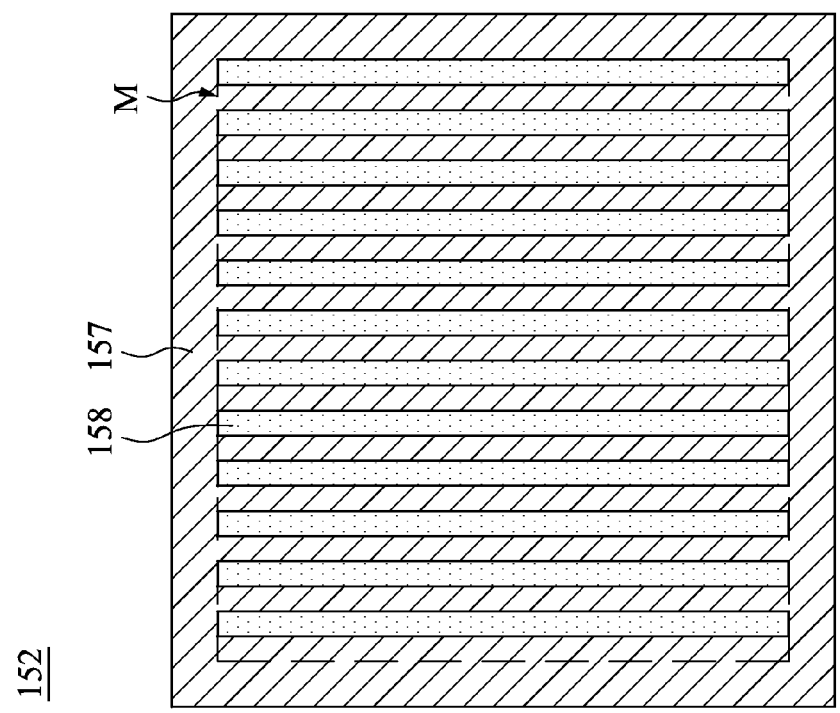
FIG. 8A is a front view of the first spatial filter of FIG. 2 according to another embodiment.

However, the structure of the first spatial filter 152 and the second spatial filter 162 are not limited to FIGS. 7A and 7B. FIG. 8A is a front view of the first spatial filter 152 of FIG. 2 according to another embodiment, and FIG. 8B is a front view of the second spatial filter 162 of FIG. 2 according to another embodiment. Reference is made to FIGS. 6, 8A, and 8B. In this embodiment, the first spatial filter 152 and the second spatial filter 162 respectively include reflective plates 157, 167 and light-absorbing layers 158, 168. The light-absorbing layers 158, 168 are respectively disposed on the reflective plates 157, 167 and respectively correspond to the even and odd columns of the pixel images P. In greater detail, when the compound image M is incident the first spatial filter 152, the odd columns of the pixel images P are reflected by the reflective plate 157 while the even columns of the pixel images P are absorbed by the light-absorbing layer 158. Hence, only the first image M1 (see FIG. 2) propagates back to the beam splitting prism group 142 (see FIG. 2). On the other hand, when the compound image M is incident the second spatial filter 162, the even columns of the pixel images P are reflected by the reflective plate 167 while the odd columns of the pixel images P are absorbed by the light-absorbing layer 168. Hence, only the second image M2 (see FIG. 2) propagates back to the beam splitting prism group 142 (see FIG. 2).

Reference is made to FIGS. 2 and 8A. To manufacture the light-absorbing layer 158, a film can be fixed on the reflective plate 157 first, and the light modulator 120 turns on the even columns of the micro mirrors, which then reflects light beam to expose the film to form the light-absorbing layer 158. Hence, the manufacturing of the light-absorbing layer 158 is complete. The manufacturing method of the second spatial filter 162 is similar to the first spatial filter 152, and, therefore, a description in this regard will not be repeated hereinafter.

Reference is made back to FIG. 1. In this embodiment, the illuminating module 110 includes a light source 112 and a light-deflecting device 114. The light source 112 is configured for providing the light beams 111. The light-deflecting device 114 is configured for deflecting the light beams 111 to different angles in sequence. For example, the light-deflecting device 114 can be a golvo-mirror, which changes the tilt angle of the mirror thereof in sequence (such as rotating along the arrow on the light-deflecting device 114 in FIG. 2) according to applied voltages. Hence, in different time periods, the light beam 111 can be deflected to different directions, wherein different deflected light beams 111 correspond to different views. The golvo-mirror mentioned above, however, is illustrative only, the light-deflecting device 114 can be a suitable device which changes the deflecting angle of the light beam 111 in sequence.

Reference is made to FIGS. 1 and 2. In this embodiment, the illuminating module 130 includes a total internal reflection prism group 132. More specifically, the total internal reflection prism group 132 includes a first prism 133 and a second prism 134. A gap 135 is formed between the first prism 132 and the second prism 134. The optical module 130 further includes a prism 136 disposed between the first prism 133 and the light modulator 120. After entering the first prism 133, the light beam 111 is reflected by the gap 135, passes through the prism 136, and is then incident the light modulator 120. Subsequently, the light modulator 120 modulates the light beam 111 into the compound image M, which is reflected back to the prism 136. The compound image M passes through the first prism 133, the gap 135, and the second prism 134 in sequence and is incident the lens module 140. A Philips prism can replace the prism 136 if the autostereoscopic projection device 100 provides color images. Also, the light modulators 120 can be plural for respectively modulating different primary-color images. Moreover, in some embodiments, the autostereoscopic projection device 100 can further include reflectors 190 and 195. The reflector 190 is configured for reflecting the light beams 111 provided by the illuminating module 110 to the optical module 130, and the reflector 195 is configured for reflecting the first images M1 and the second images M2 leaving the lens 172 to the screen 900. However, the reflectors 190 and 195 can be omitted according to different configuration designs.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An autostereoscopic projection device, comprising:
    an illuminating module for providing a plurality of light beams in sequence, wherein the light beams have different deflection angles;
    a light modulator for modulating the light beams into a plurality of compound images in sequence;
    an optical module for guiding the light beams provided by the illuminating module to the light modulator; and
    a lens module, wherein the optical module is further for guiding the compound images to the lens module, and the lens module comprises:
        a beam splitting prism group having an incident surface, a light-emitting surface, a first relay surface, and a second relay surface, and comprising a double-sided reflector disposed between the first relay surface and the second relay surface, wherein the optical module is disposed at the incident surface;
        a first spatial filter disposed at the first relay surface for filtering the compound images to a plurality of first images in sequence;
        a second spatial filter disposed at the second relay surface for filtering the compound images to a plurality of second images in sequence, wherein the second images are different from the first images; and
        a lens disposed at the light-emitting surface.

2. The autostereoscopic projection device of claim 1, wherein the beam splitting prism group further comprises:
    a first right angle prism having the incident surface and the light-emitting surface;
    a second right angle prism having the first relay surface; and
    a third right angle prism having the second relay surface, wherein the double-sided reflector is disposed between the second right angle prism and the third right angle prism.

3. The autostereoscopic projection device of claim 1, wherein the compound image comprises a plurality of pixel images arranged in an array manner, the first spatial filter only reflects odd columns of the pixel images, and the second spatial filter only reflects even columns of the pixel images.

4. The autostereoscopic projection device of claim 3, wherein the first spatial filter comprises:
    a transparent plate; and
    a reflective layer disposed on the transparent plate, wherein the reflective layer corresponds to the odd columns of the pixel images.

5. The autostereoscopic projection device of claim 3, wherein the first spatial filter comprises:
    a reflective plate; and
    a light-absorbing layer disposed on the reflective plate, the light-absorbing layer corresponds to the even columns of the pixel images.

6. The autostereoscopic projection device of claim 1, wherein the lens module further comprises:
- a first relay lens group disposed between the beam splitting prism group and the first spatial filter; and
- a second relay lens group disposed between the beam splitting prism group and the second spatial filter.

7. The autostereoscopic projection device of claim 6, wherein both of the first relay lens group and the second relay lens group are off-axially disposed from the optical axis of the compound images.

8. The autostereoscopic projection device of claim 1, wherein the lens module further comprises:
- an entrance lens group disposed between the beam splitting lens group and the optical module.

9. The autostereoscopic projection device of claim 1, wherein the optical module comprises a total internal reflection prism group.

10. The autostereoscopic projection device of claim 1, wherein the optical module comprises:
- a light source for providing the light beams; and
- a light-deflecting device for deflecting the light beams to different angles in sequence.

\* \* \* \* \*